United States Patent [19]
Green et al.

[11] 3,761,137
[45] Sept. 25, 1973

[54] BRAKING EQUIPMENT
[75] Inventors: John William Green; Rodney Edward Donovan, both of London, England
[73] Assignee: Westinghouse Brake and Signal Company, Limited, London, England
[22] Filed: Mar. 27, 1972
[21] Appl. No.: 238,331

[30] Foreign Application Priority Data
Apr. 27, 1971 Great Britain.................. 11,590/71

[52] U.S. Cl. ................................. 303/3, 303/22 R
[51] Int. Cl............................................. B60t 13/74
[58] Field of Search.......................... 303/3, 20, 22 R

[56] References Cited
UNITED STATES PATENTS
2,933,350   4/1960   Hines.................................... 303/3
3,275,380   9/1966   May...................................... 303/3
3,536,360   10/1970  Engle.................................... 303/3

Primary Examiner—Duane A. Reger
Attorney—Roberts B. Larson et al.

[57] ABSTRACT

Railway braking equipment incorporating a dynamic brake system which generates an electrical signal the value of which is dependent upon the degree of braking being effected by that system, which signal is converted into a first fluid-pressure which is compared with a second fluid-pressure indicative of the degree of overall braking required to be effected; the difference between the two fluid pressures controlling the degree of braking effected by a fluid-pressure braking system of the equipment.

18 Claims, 1 Drawing Figure

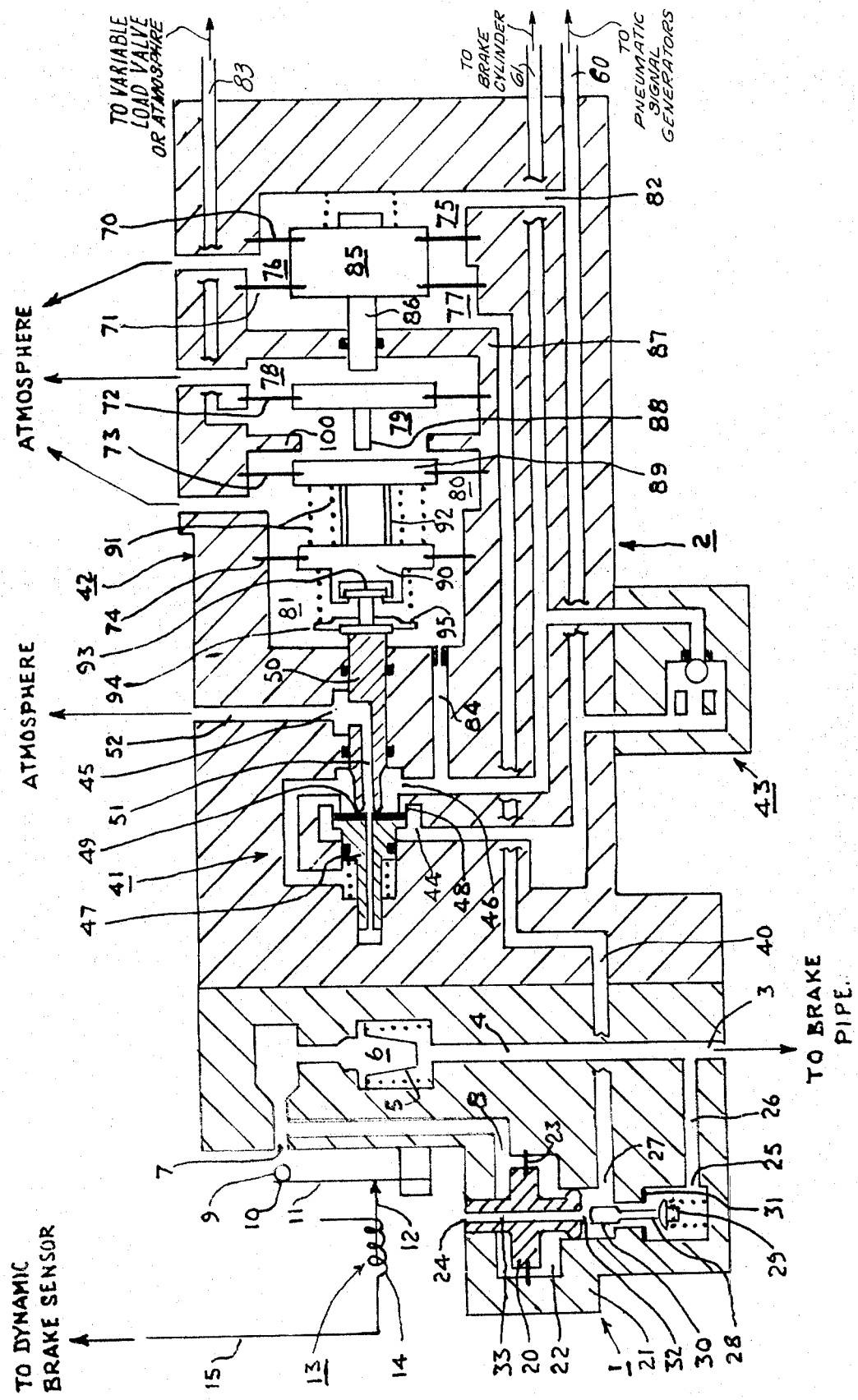

BRAKING EQUIPMENT

This invention relates to braking equipment and more particularly, although not exclusively, to railway braking equipment.

One aspect of the present invention provides braking equipment having a dynamic braking system and a fluid-pressure braking system including a brake pipe the fluid pressure in which serves to control the degree of braking effected by the fluid-pressure braking system, the equipment incorporating a converter by which an electrical input signal a value of which is indicative of the degree of braking being effected by the dynamic braking system is converted into an output fluid pressure the value of which corresponds to the value of the input signal, the source of supply of fluid pressure to the converter from which source the converter derives said output pressure of the converter being the fluid-pressure in the brake pipe, and pressure-responsive means by which said output pressure is compared with a master fluid pressure indicative of the degree of braking required to be effected by the equipment and, in accordance with the amount (if any) by which the master pressure exceeds the output pressure, operating a valve to produce therefrom an output pressure which is indicative of the amount of such excess; said output pressure from the valve effecting operation of the pneumatic braking system to a degree which is the difference between the degree of braking required to be effected by the equipment and the degree of braking being effected by the dynamic braking system.

In this specification, the term "fluid-pressure" is to be considered as including either an hydraulic or a pneumatic pressure which, in the latter case, may be sub-atmospheric or super-atmospheric.

The converter may have an input port connected to the source of fluid pressure, an outlet port and an exhaust port; a cantilever-mounted arm to which is applicable a force the value of which is dependent upon the value of the input signal; and a throttling element associated with the exhaust port and arranged to be operated through said arm by said force variably to throttle the exhaust port in dependence upon the value of the force and thereby produce at the output port a back pressure the value of which is dependent upon the value of the input signal. There may be interposed between the output port of the converter and the pressure-responsive means, a relay valve by which the back pressure is relayed as the output pressure of the converter to the pressure-responsive means. In this case, the relay valve may be fed from a source of fluid-pressure which also is the fluid-pressure in the brake pipe.

The valve, together with the pressure-responsive means, may constitute a self-lapping valve means. In this case, the pressure-responsive means may include a plurality of pressure responsive elements to one of which is applied the master pressure and to two others of which are applied respectively the output pressure of the converter and the output pressure of the valve; the force exerted by the master pressure on its pressure-responsive element being opposed by the forces exerted by the two output pressures each on their respective element.

The valve may have an inlet port connected to a source of fluid pressure, an exhaust port and an outlet port through which is delivered the output pressure of the valve, the source of fluid pressure being the master pressure. In such an arrangement the master pressure and the output pressure of the valve may be fed through first and second conduits respectively, there being connected across the conduits in parallel with the valve a one-way valve arranged to permit flow of fluid only in the direction from the second conduit to the first conduit.

The pressure-responsive means may include a force-generating means operative to cause the valve to deliver an output pressure from the valve which is of low value sufficient only to prepare the fluid-pressure braking system for effecting braking operation by the fluid-pressure braking system, when the degree of braking effected by the dynamic braking system equals the degree of braking required to be effected by the equipment. The force-generating resilient means may be rendered inoperative by the degree of braking effected by the dynamic braking system being less than the degree of braking required to be effected by the equipment. When the pressure-responsive means includes a plurality of pressure-responsive elements as above described, the force-generating resilient means may be a spring operative in opposition to the output pressure from the valve on that pressure-responsive element on which the output pressure from the valve exerts its force only for so long as the force is exerted by the master pressure and the output pressure are not equal. Another aspect of the present invention provides vehicle braking equipment having a dynamic braking system; signal-generating means by which is derived a first fluid pressure output the value of which is indicative of the degree of braking being effected by the dynamic braking system; a fluid-pressure braking system from which is derived a second fluid pressure output the value of which is indicative of the degree of braking required to be effected by the equipment; variable-load means by which can be derived a third fluid pressure output the value of which is indicative of the load of the vehicle; inhibiting means by which said third output fluid pressure is inhibited from being so indicative; and self-lapping valve means comprising a valve the operation of which is controlled by forces exerted on the valve by pressure-responsive means to derive from an input pressure constituted by the second output fluid pressure a final fluid pressure output indicative of the degree of braking to be effected by the fluid-pressure braking system; the pressure-responsive means including a pressure-responsive system in which is compared said first and second fluid pressure outputs to produce a first force; a pair of pressure-responsive elements between which is applied said third fluid pressure output to generate on one of the elements a second force which, when the third fluid pressure output is indicative of the load of the vehicle, opposes and is greater than the first force and, in such specified condition, generates on the other element a third force indicative of the load of the vehicle; a further pressure-responsive element to which is applied said final fluid pressure output to generate a further force in opposition to said third force; and between said other element of the pair of elements and the further element force-generative means exerting on the further element a fifth force of predetermined value which opposes the fourth force but which is rendered ineffective by the application between the pair of elements of said third pressure output when that pressure is indicative of the load of the vehicle.

The fluid-pressure braking system may be a system which is controlled by a fluid-pressure signal. There may additionally be a further fluid-pressure braking system which is controlled both by an electrical signal and in dependence upon the load of the vehicle, the second output fluid pressure then being derived either from the system controlled by the fluid-pressure signal or from the further fluid-pressure braking system.

There may be positioned between the pair of pressure-responsive elements between which is applied said third output pressure, an abutment against which is urged said other of the elements by the resilient means.

Said other of the pair of elements may carry a stem by which the force generating means is rendered ineffective when the third fluid pressure otuput is indicative of the load of the vehicle, by the stem engaging the further pressure-responsive element so that it thereby transmits to the further element the third force.

The force-generating means may operatively extend between said other of the pair of pressure-responsive elements and said further pressure-responsive element.

The signal-generating means may be a converter by which an electrical input signal a value of which is indicative of the degree of braking being effected by the dynamic braking system, is converted into said first fluid-pressure output.

One embodiment of the present invention will now be described in greater detail, by way of example only, with reference to the accompanying drawing which is a diagrammatic cross-sectional view of that part of braking equipment, which incorporates the present invention.

The part of the braking equipment shown in the accompanying drawings is for incorporation in railway braking equipment of the type including a dynamic braking system, an electro-pneumatic system and a wholly-pneumatic braking system some of the parts of which are common with the electro-pneumatic braking system. Such equipment, is of itself, well-known and a typical such system is the so-called "Westcode" (Registered Trade Mark) braking equipment described, for example, in Appendix 8 of "An Introduction to Railway Braking" by H.R. Broadbent and in more detail in the Paper entitled "Combined Air and Dynamic Braking Systems for Railway Vehicles, Particularly the New Lightweight Cars for the Toronto Transit Commission" by Dr. I.G. Moore presented before The Institute of Locomotive Engineers on 16th December 1963 and published in that Institution's Journal as Paper No. 651. Specifically, the part of the braking system shown in the accompanying drawing is designed for replacement of the so-called Restricted Application Limiting Valve and Release Check Valve of the Westcode braking equipment; the part shown in the accompanying drawing, inter alia, providing for the functions of the replaced Valves.

In view of the disclosure in these documents of this now well-known type of braking equipment, only a very general description of this equipment is required in this Specification.

So far as the present invention is concerned, the Westcode equipment includes duplicate pneumatic braking systems of which one is an electro-pneumatic system and the other is a wholly-pneumatic system. The electro-pneumatic system is controlled by the selective energisation in various combinations of wires which pass the length of the train and which, on each vehicle of the train, energise the selected combination of electro-magnetic valves the outputs of which are applied to a plurality of various-sized diaphragms to operate a self-lapping valve to produce therefrom a pneumatic pressure output (referred to in this specification as the "master pressure") which is applied to the brake cylinder of the vehicle to effect through the electro-pneumatic braking system a degree of braking determined by the combination of energisation of the wires. In the electro-pneumatic system, there is incorporated a Variable Load Valve by means of which the input pressures to the electro-magnet valves are varied in accordance with the loading of the vehicle so that the master pressure applied to the brake cylinder is determined not only by the combination of the energised wires but also by the load of the vehicle.

The wholly-pneumatic system includes in each vehicle a Quick Acting Triple Valve the operation of which is controlled by the pressure in a brake pipe running the length of the train, to produce pneumatic pressure output from the Triple Valve (again, constituting an alternative master pressure of the present invention) which is also applicable to the brake cylinder. This pneumatic braking system is a stand-by system against the event of failure of the electro-pneumatic system.

The master pressure derived from the electro-pneumatic braking system is applied to a transducer which controls the degree of operation of a dynamic braking system incorporated in the equipment. The dynamic brake system is inoperative during a wholly-pneumatic brake application.

The Westcode braking equipment further includes a Restricted Application Magnet Valve (referred to in this specification as "inhibiting" means) which, for the wholly-pneumatic system, allows the output (indicative of the loading of the vehicle) from the Variable Load Valve to pass to a so-called Restricted Application Limiting Valve to limit the pneumatic pressure applied to the Brake Cylinder to that which is consistent with the load of the vehicle.

The present invention is concerned with the problem of "blending" of the effectiveness of the dynamic braking system with that of the electro-pneumatic braking system.

It is well-known that the effectiveness of a dynamic braking system falls off with the speed of the vehicle and that in equipment in which such a system is incorporated, it is desirable that means should be provided for causing the elctro-pneumatic braking system or the wholly-pneumatic braking system taking over from the dynamic braking system as the latter's effectiveness drops off.

Turning now to the accompanying drawing, the part of the equipment here shown comprises, essentially, two units. Firstly, there is the electro-pneumatic converter 1 and, secondly there is the proportioning means 2.

The electro-pneumatic converter unit 1 has a port 3 connected to the conventional brake pipe and through which the pressure in the brake pipe is fed through a conduit 4 and, a filter 5 to a chamber 6. Communicating with the chamber 6 is an exhaust port 7 and an output port 8. Associated with the exhaust port 7 is a throttling member 9 adjacent the free-end 10 of a cantilever-mounted arm 11 against which bears the armature 12 of a solenoid 13 the coil 14 of which is arranged to be energised over wire 15 connected to a dynamic brake sensor (not shown).

The dynamic brake sensor senses the degree of braking being effected by the dynamic braking system and produces on wire 15 (and, therefore, in coil 14) an electrical signal in the form of a current the value of which varies in proportion to the degree of braing being effected by the dynamic braking system. Such variation in the current flowing through the coil 14 will cause the armature 12 to exert on the arm 11 a downwardly-directed force the value of which will vary with the value of the current passing through the coil 14 and, therefore, in dependence upon the degree of braking being effected by the dynamic braking system. This variation of force applied to the arm 11 will be transmitted to the throttling element 9 through the free-end 10 of the arm 11 so that the throttling element 9 will be urged with a force dependent upon the degree of braking being effected by the dynamic braking system, towards the exhaust port 7. The downwardly-directed force thus exerted on the throttling element 9 will be opposed by the force exerted by the air escaping from the exhaust port 7 so that the throttling element 9 will take-up a position in which these forces are balanced thus resulting in a degree of throttling of the exhaust port 7 which, again, is dependent upon the degree of braking being effected by the dynamic braking system. This variable throttling of the exhaust port 7 will generate at the outlet port 8 a brake-pressure the value of which will be dependent upon the degree of throttling of the exhaust port 7.

The output port 8 constitutes also the inlet port to a chamber 20 of a relay valve 21 the chamber 20 being separated from a chamber 22 by a diaphragm 23.

The relay valve has an exhaust port 24, an input port 25 connected by a conduit 26 to the conduit 4, and an output port 27.

The valve 21 further includes a dumb-bell shaped valve closure element 28 having, at one end, a valve closure position 29 and, at the other end, a valve closure position 29 and, at the other end, a valve closure portion 30. The valve closure portion 29 is co-operable with a valve seat 31 and the valve closure portion 30 is co-operable with a valve seat 32 at the opposite end of a conduit 33 (which passes through the diaphragm 23) from the exhaust port 24.

The brake pipe pressure thus acts as the supply pressure to the input port 25 of the relay valve 21 and (in the position of the part as shown in the drawing) this pressure will pass past the dumb-bell shaped valve element 28 into the chamber 22 where the pressure will oppose any pressure applied to the chamber 20.

The relay valve will act as a self-lapping valve so that the pressure in the chamber 22 (and, therefore, the pressure at the outlet port 27) will be equal to any pressure in the chamber 20.

It will be seen, therefore, that the value of the pressure appearing at the output port 27 of the relay valve 21 and applied to the conduit 40 will be dependent upon the pressure in the chamber 20 of the relay valve 21 and, therefore, on the degree of braking being effected by the dynamic braking system.

Turning now to the proportioning unit 2, this comprises a valve 41, a pressure-responsive means 42, and a one-way valve 43 (the equivalent of the Release Check Valve of the Westcode braking equipment), the valve 41 and the pressure-responsive means 42 constituting together self-lapping valve means.

The valve 41 has an inlet port 44, an exhaust port 45, and an outlet port 46. The valve 41 further has a fully-balanced valve closure member 47 the lower face of which is engageable with concentric valve seats 48 and 49; the valve seat 48 being formed in the body of the proportioning unit 2 and the valve seat 49 being formed by the upper end of a valve stem 50 through which extends a bore 51 communicating with the exhaust port 45 open to atmosphere through conduit 52.

The inlet port 44 is in communication with a conduit 60 to which is applied the master pressure which, as above described, is the output pressure of either the electro-pneumatic braking system or the wholly-pneumatic braking system which is eventually applied to the brake cylinder as will be described in greater detail hereinafter.

The outlet port 46 communicates with a conduit 61 which is connected to the brake cylinder of the vehicle. As can be seen from the drawing, the one-way valve 43 is connected across the conduits 60 and 61 in parallel to the valve 41, being so arranged as to allow the passage of air through the one-way valve only in the direction from the conduit 61 to the conduit 60.

The pressure-responsive means comprises a series of diaphragms 70 to 74 delineating chambers 75 to 81.

The chamber 75 is connected via conduit 82 to conduit 60; the chamber 76 is open to atmosphere; the chamber 77 is connected to conduit 40; the chamber 78 is open to atmosphere; the chamber 79 is connected via a conduit 83 to the output of the variable load valve of the electro-pneumatic braking system; the chamber 80 is open to atmosphere; and the chamber 81 is connected via a conduit 84 to the conduit 61.

The two diaphragms 70 and 71 are mechanically coupled together by a diaphragm-follower 85 from which projects upwardly a push-rod 86 extending through a partition 87 which, on the one hand, forms one wall of the chamber 77 another wall of which is formed by the diaphragm 71 and, on the other hand, one wall of the chamber 78 another wall of which is formed by the diaphragm 72.

The diaphragm 72 also has a diaphragm-follower 87 from which projects a push-rod 88 in the direction towards the diaphragm 73 which, together with the diaphragm 72, forms a pair of diaphragms constituting opposed walls of the chamber 79.

The diaphragm 73 also has a diaphragm-follower 89 as does the diaphragm 74 have a diaphragm-follower 90. Extending between the two diaphragm-followers 89 and 90 are a pair of concentric springs 91 encircling a tubular push-rod 92 carried by the diaphragm-follower 89 of the diaphragm 73 and projecting towards the diaphragm 74.

The diaphragm-follower 90 of the diaphragm 74 "trape" a head 93 of the valve stem 50 and has extending between the diaphragm-follower 90 and a washer 94 a spring 95; the washer 93 being urged by the spring 95 into engagement with a shoulder on the valve stem 50.

The above-described part of the equipment operates as follows.

An electro-pneumatic brake application will be initiated in the conventional manner by the energisation of a combination of the wires of the Westcode braking equipment which is indicative of the degree of braking required to be effected by the equipment. The energisation of this combination of wires will cause the electro-magnetic valves to be operated such that the electro-pneumatic braking system produces an output pressure which, as above described, will be dependent not only upon the degree of braking indicated as required by the combination which has been energised of the wires but also in dependence upon the load of the vehicle. This output pressure will appear as a master pressure in the conduit 60 from whence it will be applied through the conduit 82 to the chamber 75 and, also, to the inlet port 44 of the valve 41.

This output pressure will also, through the transducer above-mentioned, initiate operation of the dynamic braking system and operation of this system will, in accordance with the degree of its operation, apply the electric signal to the wire 15 of the electro-pneumatic converter 1. As explained above, this signal (in the form of an electric current the value of which is dependent upon the degree of braking being effected by the dynamic brake system) will determine the output pressure appearing at the outlet port 27 of the relay valve 21 to be applied through the conduit 40 to the chamber 77.

Assuming that, at this stage, the dynamic braking system is capable of providing the totality of the braking effort required to be exerted, the pressures in the chambers 75 and 77 will be equal so that the forces applied to the diaphragm-follower 85 common to the two diaphragms 70 and 71 will be equal and these diaphragms will remain in the position as shown in the drawing.

By virtue of the Restricted Application Magnet Valve of the Westcode braking equipment, so long as the dynamic braking system is effective, this Valve will be in a condition in which the output of the Variable Load Valve of Westcode will be inhibited from being applied to chamber 79 which chamber, through the Restricted Application Magnet Valve, will be vented to atmosphere.

Chamber 79 being so vented to atmosphere, spring 91 will move the diaphragm 73 downwardly so that its diaphragm-follower 89 will be engaged with an annular abutment 100 projecting inwardly of the chamber 79 between the diaphragms 72 and 73. Equally, the spring 91 will urge the diaphragm-follower 90 of the diaphragm 74 upwardly so that (through the head 93) the valve stem 50 will also be urged upwardly. Such upward movement of the valve stem 50 will, firstly, close-off the bore 51 to shut the exhaust port 52 of the valve 41 and, thereafter, will move the valve closure element 47 off the seat 48 so that air may flow from the conduit 60 through the inlet port 44 of the valve 41 through the now-open valve seat 48 to the conduits 61 and 84. From the conduit 84, air will flow into the chamber 81 until the pressure in this chamber 81 applied to the diaphragm 74 will be sufficient to overcome the force exerted upwardly by the spring 91. When this happens, the valve 41 will "lap-off" with a pressure in chamber 81 determined by the value of the force exerted upwardly on the diaphragm-follower 90 by the spring 91. There will, of course, be a similar pressure in the conduit 61 which, therethrough, will have been applied to the brake cylinder.

The value of the force exerted by the springs 91 has been pre-determined to be of such a value that the pressure thus generated in the brake cylinder is sufficient only to prepare the electro-pneumatic braking system for effecting by that system a braking operation; that is to say, the brake blocks will be moved into rubbing-engagement with the wheels.

As the vehicle loses speed under the influence of the braking effected by the dynamic braking system, the effectiveness of this system will fall away with the result that the value of the current applied over wire 15 to the coil 12 of the electro-pneumatic converter 1 will similarly fall. This will result in the downward force exerted on the throttling element 9 reducing so that the throttling element will be moved upwardly by the force exerted on it by the air escaping from the exhaust port 7 with resultant fall in the back-pressure applied to the chamber 20. Such fall in pressure in the chamber 20 will result in a similar fall of pressure in the conduit 40 as the valve seat 32 is moved away from the valve closure portion 30 to open the exhaust port 24 of the relay valve 21. Such fall of pressure will be transmitted to the chamber 77 so that there is now no longer a balance of forces across the common diaphragm-follower 85 of the diaphragm-follower 85 of the diaphragms 70 and 71; the upward force derived from the pressure in chamber 75 exerted on the diaphragm 70 exceeding the downward force generated by the pressure in chamber 77 applied to the diaphragm 71.

In consequence, the diaphragm-follower 85 will move upwardly so that its push-rod will engage the diaphragm-follower 87 on the diaphragm 72 moving that diaphragm-follower also upwardly to engage its push-rod 88 with the diaphragm-follower 89 of the diaphragm 73. The upwardly-directed force thus exerted on the diaphragm-follower 89 will further collapse the spring 91 until the tubular push-rod 92 of the diaphragm-follower 89 engages the diaphragm-follower 90 of the diaphragm 74 thus increasing the upwardly-directed force on that diaphragm 74. This force on diaphragm 74 will overcome the downwardly-directed force resulting from the application to the diaphragm 74 of the pressure in chamber 81 so that the valve stem 50 will be moved upwardly again to displace the valve closure element 47 from the valve seat 48. Hence, the valve 41 will be re-operated to allow air to flow from the conduit 60 into the conduit 61 through the now-open valve 41. Thus, the pressure in the brake cylinder will increase as will also the pressure in the chamber 81 until that pressure in the chamber 81 exerts a downward force on the diaphragm 74 which, together with the downward force exerted on the diaphragm 71 by the pressure in the chamber 77, balances the upward force generated on the diaphragm 70 by the pressure in the chamber 75. In this condition, the valve 41 will again lap off with a pressure in the brake cylinder which is such as to effect operation of the pneumatic braking system to a degree which is the difference between the degree of braking indicated as being required to be effected by the equipment (by the above-mentioned energisation of combination of wires generating in conduit 60 a corresponding pressure) and the degree of braking actually being effected by the dynamic braking system.

It will be seen from the above description that as the effectiveness of the dynamic braking system steadily falls-away, it will be replaced by increasing effectiveness of the pneumatic braking system.

When the effectiveness of the dynamic braking system has fallen-away to a very low value (either by virtue of normal fall-away or because of sudden failure of the dynamic braking system), the Restricted Application Magnet Valve of the Westcode equipment will be operated to shut-off communication of the chamber 79 to atmosphere and connect that chamber to the output of the Variable Load Valve of Westcode.

The area of diaphragm 72 being greater than that of diaphragm 70, the downward force exerted by the diaphragm 72 (from the application to that diaphragm of the output from the Westcode Variable Load Valve) will be sufficient to overcome the upward force exerted by the diaphragm 70 (from the application to that diaphragm of the master pressure output in conduit 60 indicative of the degree of braking required to be effected by the braking equipment and the value of which, in any case, is already load-dependent as explained above) so that the portion of the pressure responsive means below the wall 87 is effectively rendered inoperative.

The output pressure of the Westcode Variable Load Valve applied to the chamber 79 will, of course, cause the diaphragm 73 to exert an upwardly-directed force on the diaphragm 74 through the stem 92; which force being greater than that exerted by the springs 91 will collapse those springs to engage the upper end of the stem 92 with the underside of the follower 90 of diaphragm 74. However, as this is a load-dependent force and as the master pressure in conduit 60 is also load-dependent the force exerted upwardly on the diaphragm 74 by the diaphragm 73 will not modify the output pressure of the valve 41 applied to conduit 61; the pressure in the conduit 60 passing unaltered through the valve 41 to the conduit 61.

In the known Westcode braking equipment, the Restricted Application Limiting Valve is incorporated to effect load-limiting of the output pressure of the wholly-pneumatic braking system. As the part of the equipment shown in the accompanying drawing replaces that Restricted Application Limiting Valve, the part shown in the accompanying drawing incorporates means for achieving a similar function as that of the replaced Valve.

As mentioned above, during operation of the wholly-pneumatic braking system of Westcode the dynamic braking system is not rendered operative by the output of the Quick Acting Triple Valve, and (in this mode of operation) the various parts operate as follows.

The dynamic braking system being inoperative, no signal will be applied to the converter 1 and, thus, no pressure will be applied to the chamber 77 to be effective on the diaphragm 71.

Because the dynamic braking system is inoperative, the Westcode Restricted Application Limiting Valve will be operated to a condition to allow the output of the Variable Load Valve to be applied to chamber 79. This output pressure applied to chamber 79 will (as for the electro-pneumatic mode of operation above described in the event of the dynamic braking system ceasing to be effective) render inoperative that portion of the converter 1 below and including the diaphragm 72 by virtue of the diaphragm 72 being larger in area than the diaphragm 70 to which is applied the output from the Westcode Quick Acting Triple Valve indicative of the required degree of braking.

However, this time, bearing in mind that the output master pressure from the Westcode Quick Acting Triple Valve is not load-dependent, the load-dependent pressure in chamber 79 whilst (as before) overcoming the force exerted by springs 91, will serve to limit the output of the valve 41 applied through conduit 61 to the brake cylinder to a pressure dependent on the loading of the vehicle.

It will thus be seen that the part of the proportioning means 2 above the abutment 100 is functionally the same as the Restricted Application Limiting Valve of the known Westcode.

Due to the presence of the springs 91, during release of the brakes, the valve 41 will close off the exhaust port 52 by the valve closure element engaging seat 49 on the stem 50 before all of the air has been exhausted from the brake cylinder; the amount of air thus "trapped" in the brake cylinder being that which is determined by the value of the spring 91. It is for this reason that the one-way valve 43 is provided. In release of the brakes, the pressure in the conduit 60 will be completely reduced to atmosphere so that, therefore, the pressure in the conduit 61 (and the brake cylinder will exceed that in the conduit 60. Hence, this excess pressure will escape via the one-way valve 43 and the conduit 60 which will have been opened to atmosphere by operation of either the electro-pneumatic braking system or the wholly-pneumatic braking system to the "release" condition.

Having thus described our invention what we claim is:

1. Braking equipment having a dynamic braking system and a fluid pressure braking system including a brake pipe, the fluid pressure in which serves to control the degree of braking effected by the fluid pressure braking system, the equipment comprising: a converter means for converting into an output fluid pressure an electrical input signal, the value of which input signal is indicative of the degree of braking being effected by the dynamic braking system and the value of which output fluid pressure corresponds to the value of the input signal; the source of supply of fluid pressure to the converter means from which source the converter means derives said output fluid pressure being the fluid-pressure of the brake pipe, pressure-responsive means for comparing with said output pressure a master fluid pressure indicative of the degree of braking required to be effected by the equipment, and a valve means for producing an output pressure indicative of the excess, if any, by which the master pressure exceeds the output pressure, and means for effecting operation of the pneumatic braking system in response to the output pressure from the valve to a degree which is the difference between the degree of braking required to be effected by the equipment and the degree of braking being effected by the dynamic braking system.

2. Braking equipment as claimed in claim 1, wherein the converter means has an input port connected to the source of fluid pressure, an outlet port and an exhaust port; a cantilever-mounted arm to which is applicable a force the value of which is dependent upon the value of the input signal; and a throttling element associated with the exhaust port and arranged to be operated through said arm by said force variably to throttle the exhaust port in dependence upon the value of the force and thereby produce at the output port a back pressure the value of which is dependent upon the value of the input signal.

3. Braking equipment as claimed in claim 2, wherein there is interposed between the output port of the converter means and the pressure-responsive means, a relay valve by which the back pressure is relayed as the output pressure of the converter means to the pressure-responsive means.

4. Braking equipment as claimed in claim 3, wherein the relay valve is fed from a source of fluid pressure which also is the fluid-pressure in the brake pipe.

5. Braking equipment as claimed in claim 1, wherein the valve means together with the pressure-responsive means, constitutes a self-lapping valve means.

6. Braking equipment as claimed in claim 5, wherein the pressure-responsive means includes a plurality of pressure responsive elements, to one of which is applied the master pressure and to two others of which are applied, respectively, the output pressure of the converter means and the output pressure of the valve means; the force exerted by the master pressure on its pressure-responsive element being opposed by the forces exerted by the two output pressures each on their respective elements.

7. Braking equipment as claimed in claim 1, wherein the valve means has an inlet port connected to a source of fluid pressure, an exhaust port and an outlet port through which is delivered the output pressure of the valve means, the soruce of pressure being the master pressure.

8. Braking equipment as claimed in claim 7, wherein the master pressure and the output pressure of the valve means are fed through first and second conduits, respectively, there being connected across the conduits in parallel with the valve means a one-way valve arranged to permit flow of fluid only in the direction from the second conduit to the first conduit.

9. Braking equipment as claimed in claim 1, wherein the pressure-responsive means includes a force-generating means operative to cause the valve means to deliver an output pressure from the valve means which is of low value sufficient only to prepare the fluid-pressure braking system for effecting braking operation by the fluid-pressure braking system, when the degree of braking effected by the dynamic braking system equals the degree of braking require to be effected by the equipment.

10. Braking equipment as claimed in claim 9, wherein the force-generating means is rendered inoperative by the degree of braking effected by the dynamic braking system being less than the degree of braking required to be effected by the equipment.

11. Braking equipment as claimed in claim 6, wherein the force generating means is rendered inoperative by the degree of braking effected by the dynamic braking system being less than the degree of braking required to be effected by the equipment, wherein the force-generating means is a spring operative in opposition to the output pressure from the valve means on that pressure-responsive element on which the output pressure from the valve exerts its force only for so long as the force is exerted by the master pressure and the output pressure are not equal.

12. Vehicle braking equipment having a dynamic braking system; signal-generating means by which is derived a first fluid a first fluid pressure output the value of which is indicative of the degree of braking being effected by the dynamic braking system; a fluid-pressure braking system from which is derived a second fluid pressure output the value of which is indicative of the degree of braking required to be effected by the equipment; variable-load means by which can be derived a third fluid pressure output the value of which is indicative of the load of the vehicle; inhibiting means by which said third output fluid pressure is inhibited from being so indicative; and self-lapping valve means comprising a valve the operation of which is controlled by forces exerted on the valve by pressure-responsive means to derive from an input pressure constituted by the second output fluid pressure a final fluid pressure output indicative of the degree of braking to be effected by the fluid-pressure braking system; the pressure-responsive means including a pressure-responsive system in which is compared said first and second fluid pressure outputs to produce a first force; a pair of pressure-responsive elements between which is applied said third fluid pressure output to generate on one of the elements a second force which, when the third fluid pressure output is indicative of the load of the vehicle, opposes and is greater than the first force and, in such specified condition, generates on the other element a third force indicative of the load of the vehicle; a further pressure-responsive element to which is applied said final fluid pressure output to generate a further force in opposition to said third force; and between said other element of the pair of elements and the further element force-generative means exerting on the further element a fifth force of predetermined value which opposes the fourth force but which is rendered ineffective by the application between the pair of elements of said third pressure output when that pressure is indicative of the load of the vehicle.

13. Braking equipment as claimed in claim 12, wherein the fluid-pressure braking system is a system which is controlled by a fluid-pressure signal.

14. Braking equipment as claimed in claim 13, wherein there is additionally a further fluid-pressure braking system which is controlled both by an electrical signal and in dependence upon the load of the vehicle, the second output fluid pressure then being derived either from the system controlled by the fluid-pressure signal or from the further fluid-pressure braking system.

15. Braking equipment as claimed in claim 12, wherein there is positioned between the pair of pressure-responsive elements between which is applied said third output pressure, an abutment against which is urged said other of the elements by the resilient means.

16. Braking equipment as claimed in claim 12, wherein said other of the pair of elements carries a stem by which the force generating means is rendered ineffective when the third fluid pressure output is indicative of the load of the vehicle, by the stem engaging the further pressure-responsive element so that it thereby transmits to the further element the third force.

17. Braking equipment as claimed in claim 12, wherein the force-generating means operatively extends between said other of the pair of pressure-responsive elements and said further pressure-responsive element.

18. Braking equipment as claimed in claim 12, wherein, the signal-generating means is a converter by which an electrical input signal a value of which is indicative of the degree of braking being effected by the dynamic braking system, is converted into saie first fluid-pressure output.

* * * * *